(12) United States Patent
Iyoda et al.

(10) Patent No.: US 7,892,696 B2
(45) Date of Patent: Feb. 22, 2011

(54) LIQUID FUEL CONTAINER, FUEL CELL SYSTEM, AND PORTABLE INFORMATION TERMINAL DEVICE

(75) Inventors: Makoto Iyoda, Sakai (JP); Hiroto Inoue, Hirakata (JP); Suguru Nakao, Itami (JP); Yukihiro Iwata, Ibaraki (JP); Yasuo Yokota, Hirakata (JP); Toshiaki Takasu, Osaka (JP)

(73) Assignee: Panasonic Corporation, Osaka (JP)

( * ) Notice: Subject to any disclaimer, the term of this patent is extended or adjusted under 35 U.S.C. 154(b) by 1090 days.

(21) Appl. No.: 10/567,603

(22) PCT Filed: May 2, 2005

(86) PCT No.: PCT/JP2005/008298

§ 371 (c)(1),
(2), (4) Date: Feb. 8, 2006

(87) PCT Pub. No.: WO2005/109558

PCT Pub. Date: Nov. 17, 2005

(65) Prior Publication Data
US 2008/0026278 A1 Jan. 31, 2008

(30) Foreign Application Priority Data
May 11, 2004 (JP) ............... 2004-140651

(51) Int. Cl.
*H01M 2/02* (2006.01)
(52) U.S. Cl. ............ 429/512; 429/408; 429/414; 429/424; 429/515; 220/586
(58) Field of Classification Search ............ 429/12, 429/34, 408, 414, 424, 512, 515; 220/586
See application file for complete search history.

(56) References Cited

U.S. PATENT DOCUMENTS

| 3,317,283 | A * | 5/1967 | King ............... 422/57 |
| 4,079,729 | A * | 3/1978 | Cornell ............ 600/577 |
| 4,416,617 | A * | 11/1983 | Ebbeson ............ 431/326 |
| 2003/0082427 | A1* | 5/2003 | Prasad et al. ........ 429/34 |
| 2003/0097762 | A1* | 5/2003 | Hsu ............... 34/218 |
| 2004/0021750 | A1 | 2/2004 | Ushiro |
| 2004/0072049 | A1* | 4/2004 | Becerra et al. ....... 429/34 |
| 2005/0008908 | A1* | 1/2005 | Kaye et al. .......... 429/20 |
| 2005/0023236 | A1* | 2/2005 | Adams et al. ........ 215/3 |

FOREIGN PATENT DOCUMENTS

| JP | 2003-015467 | * | 6/1989 |
| JP | 3-15467 | | 1/1991 |
| JP | 03-015467 | * | 1/1991 |
| JP | 4-128832 | | 11/1992 |
| JP | 7-306113 | | 11/1995 |
| JP | 9-272526 | | 10/1997 |
| JP | 2002-164070 | | 6/2002 |
| JP | 2002-352828 | | 12/2002 |

(Continued)

*Primary Examiner*—Ula C Ruddock
*Assistant Examiner*—Amanda Barrow
(74) *Attorney, Agent, or Firm*—Wendetroth, Lind & Ponack, L.L.P.

(57) ABSTRACT

By providing a coloring agent, which is brought in contact with the liquid fuel leaked from an outer peripheral portion of the liquid fuel holding section that is configured to hold the liquid fuel and by which the contact portion is changed in color, in at least part of the outer peripheral portion, the leakage of the liquid fuel from the liquid fuel holding section can be visually detected swiftly and easily without providing any special detection device.

12 Claims, 11 Drawing Sheets

FOREIGN PATENT DOCUMENTS

| | | |
|---|---|---|
| JP | 2003-36879 | 2/2003 |
| JP | 2003-45468 | 2/2003 |
| JP | 2003-92128 | 3/2003 |
| JP | 2003-257466 | 9/2003 |
| JP | 2004-6335 | 1/2004 |
| JP | 2004-122750 | 4/2004 |
| JP | 2004-335330 | 11/2004 |
| JP | 2005-11616 | 1/2005 |

* cited by examiner

LIQUID FUEL CONTAINER, FUEL CELL SYSTEM, AND PORTABLE INFORMATION TERMINAL DEVICE

TECHNICAL FIELD

The present invention relates to a liquid fuel container, a fuel cell system and a portable information terminal device capable of allowing the visual detection of the leakage of a liquid fuel.

BACKGROUND ART

A fuel cell system (hereinafter referred to as a fuel cell), which has a high conversion efficiency in electrochemically converting the chemical energy owned by the liquid fuel into electrical energy, attracts attention as effective energy supplying means (i.e., power generation method and device) from the viewpoint of energy saving and environmental protection. Furthermore, such a fuel cell system, which can continuously generate an electric power while the liquid fuel continues to be supplied, attracts attention as a power source for use in portable information equipment such as laptop personal computers of which the power consumption keeps increasing in accordance with functional advancement and as a transportable power source. Moreover, the fuel cell system can operate to drive equipment of larger power consumption and for a longer time than the conventional rechargeable battery.

Various problems must be solved in order to apply a power supply system of high energy efficiency, such as the fuel cell, to portable or transportable power sources as a substitute for the rechargeable battery by reducing the size and the weight of the system in the future.

Particularly, in a direct type methanol fuel cell (DMFC (Direct Methanol Fuel Cell)) that uses methanol as the liquid fuel and generates an electric power by taking protons out of the methanol, it is considered that the methanol, which is a deleterious substance, exerts large influences on not only the user but also the surrounding environment. Therefore, it is necessary to suppress the emission of the liquid fuel supplied to the fuel cell, intermediate products of chemical reactions and emission matters (products) from the fuel cell into the atmosphere as much as possible.

It is well known that methanol, which is inflammable and toxic, requires sufficient care in the storage and handling thereof. If the methanol leaked from the fuel cell adheres to the human body or is taken into the body by mistake, it is possible that the human body will be harmed.

Moreover, the liquid fuel is supplied by providing the fuel cell with a cartridge typed container that holds the liquid fuel, and the continuous supply of the liquid fuel is achieved by replacing the cartridge. However, if the cartridge that is supplying the liquid fuel in the fuel cell suddenly falls off the equipment, there is concern that a large amount of methanol might leak from a connection port, and the possibility of harming the human body is further increased.

Accordingly, in the fuel cell described in Japanese unexamined patent publication No. 2003-45468, a fuel storage section for storing a liquid fuel is provided in a fuel cartridge, and an absorber for absorbing the fuel is placed in a space between the fuel cartridge and the fuel storage section. If the fuel leaks from the fuel storage section when the used fuel cartridge is removed from the electronic equipment, the fuel is absorbed by the absorber placed in the space between the fuel storage section and the cartridge, preventing leakage of the fuel to the outside of the cartridge.

Moreover, in the fuel cell described in Japanese unexamined patent publication No. 2003-92128, the fuel cartridge is internally divided into two chambers by a partition, the divided first chamber serving as a chamber for storing the fuel and the second chamber serving as a chamber for storing emission matters from the fuel cell. The internal volumes of the two chambers are changed according to the fuel consumption by freely deforming the partition, and the emission matters are prevented from being emitted to the atmosphere by being stored.

However, the fuel cells described in JP 2003-45468 and JP 2003-92128 assume that the cartridge that holds the liquid fuel is not damaged or the liquid fuel does not leak from the connection port of the cartridge. There is no consideration for safety in the case where the cartridge is damaged by an impact, or the like, and the internal liquid fuel and the emission matters leak to the outside of the cartridge, at the worst, by informing the user of the leakage or other measures. Considering the popularization of portable information equipment employing the fuel cell in the future, various use methods are supposed. Therefore, in consideration of the leakage of the liquid fuel, a means for confirming the leakage by the user easily in the early stage is needed.

Particularly, in the case of DMFC, methanol (or a methanol aqueous solution) used for the fuel is colorless, and the liquid fuel is inconspicuous even when it leaks from the cartridge that holds the liquid fuel. Therefore, it is possible that the discovery of the leakage might be late. Moreover, when the fuel cell is employed as a power source for portable information equipment, the leakage of the liquid fuel to the outside might cause troubles of a short circuit in the main body or the peripherals of the equipment equipped with the fuel cell and the deterioration, contact failure and so on of electrical components. Furthermore, when methanol of a high concentration is used as a fuel as a consequence of an improvement in the fuel cell performance, the detection of fuel leakage becomes important in terms of safety.

SUMMARY OF THE INVENTION

From the above viewpoints, the liquid leakage from the cartridge of the power generation module or the fuel cell needs to be discoverable easily in the early stage by the user.

An object of the present invention is to solve the problems and provide a liquid fuel container capable of letting the user swiftly and easily recognize the leakage of the liquid fuel from a liquid fuel holding section that holds the liquid fuel used for power generation in a fuel cell system, a fuel cell system capable of being equipped with the container and a portable information terminal device.

In order to achieve the above object, the present invention has the following constitutions.

According to a first aspect of the present invention, there is provided a liquid fuel container comprising:

a liquid fuel holding section that is configured to hold a liquid fuel used for electric power generation in a fuel cell system while allowing the fuel to be supplied to the fuel cell system; and a coloring agent, which is placed in at least part of an outer peripheral portion of the liquid fuel holding section, for changing color of the liquid fuel by coming in contact with the liquid fuel leaked from the liquid fuel holding section.

According to a second aspect of the present invention, there is provided the liquid fuel container as defined in the first aspect, wherein the coloring agent is placed so as to cover roughly entire outer peripheral portion of the liquid fuel holding section.

According to a third aspect of the present invention, there is provided the liquid fuel container as defined in the first aspect, wherein the liquid fuel holding section has a connection port for connecting to a fuel cell body in the fuel cell system so as to allow the held liquid fuel to be supplied, and the coloring agent is placed in a neighborhood of the connection port at the outer peripheral portion of the liquid fuel holding section.

According to a fourth aspect of the present invention, there is provided the liquid fuel container as defined in the first aspect, further comprising:

a coloring agent holding section that is configured to hold the coloring agent in a state in which the coloring agent is placed at the outer peripheral portion of the liquid fuel holding section.

According to a fifth aspect of the present invention, there is provided the liquid fuel container as defined in the first aspect, wherein the liquid fuel is methanol, and the coloring agent is formed containing cobalt chloride of a solid phase.

According to a sixth aspect of the present invention, there is provided the liquid fuel container as defined in the fourth aspect, wherein the liquid fuel is methanol, and the coloring agent is cobalt chloride aqueous solution.

According to a seventh aspect of the present invention, there is provided the liquid fuel container as defined in the sixth aspect, wherein the coloring agent holding section is configured to introduce part of water generated by electric power generation in the fuel cell system connected to the liquid fuel container so as to allow the liquid fuel held in the liquid fuel container to be supplied, and the cobalt chloride aqueous solution is generated by the water introduced into the coloring agent holding section and the held cobalt chloride of a solid phase.

According to an eighth aspect of the present invention, there is provided the liquid fuel container as defined in the first aspect, further comprising:

a product holding section that is configured to collect and hold water generated by electric power generation in the fuel cell system, wherein the coloring agent is placed at the outer peripheral portions of the liquid fuel container and the product holding section, and leakage of the liquid fuel and leakage of the water are detected by a difference in a change of color colored by the coloring agent.

According to a ninth aspect of the present invention, there is provided the liquid fuel container as defined in the fourth aspect, wherein the coloring agent holding suction has a visual recognition window that allows a state of color of the coloring agent to be visually recognized through the window.

According to a tenth aspect of the present invention, there is provided the liquid fuel container as defined in the fourth aspect, wherein the coloring agent holding suction further comprises an absorber for absorbing and retaining the liquid fuel leaked from the liquid fuel holding section.

According to an eleventh aspect of the present invention, there is provided a fuel cell system comprising:

a container mounting portion on which the liquid fuel container as defined in any one of the first aspect through the tenth aspect is detachably mounted, and a fuel cell body for generating electric power by using the liquid fuel supplied from the liquid fuel container mounted on the container mounting portion.

According to a twelfth aspect of the present invention, there is provided a portable information terminal device including a power source of the fuel cell system that has a container mounting portion on which the liquid fuel container as defined in the ninth aspect is detachably mounted and a fuel cell body for generating electric power by using the liquid fuel supplied from the liquid fuel container mounted on the container mounting portion, the terminal device comprising:

a device-side visual recognition window, which allows the state of the color of the coloring agent to be visually recognized through the visual recognition window of the liquid fuel container in a state where the container is mounted on the container mounting portion and is provided in a position aligned with the visual recognition window.

According to a thirteenth aspect of the present invention, there is provided a liquid fuel leakage detection method for a liquid fuel container that holds a liquid fuel used for electric power generation in a fuel cell system while allowing the fuel to be supplied to the system, comprising:

causing a change in color by bringing the liquid fuel in contact with a coloring agent when the held liquid fuel leaks out of the liquid fuel container, and visually detecting the leakage by observing the change in color.

According to the first aspect of the present invention, by virtue of the coloring agent that changes the color of the liquid fuel by coming in contact with the liquid fuel leaked from the outer peripheral portion (or a coloring agent that changes the color of the contact portion) placed in at least part of the outer peripheral portion of the liquid fuel holding section that holds the liquid fuel, the leakage of the liquid fuel from the liquid fuel holding section can be visually detected swiftly and easily without providing any special detection device. In particular, according to such construction, the user of the fuel cell system or the like can visually recognize the occurrence of the leakage swiftly and easily.

Moreover, by placing the coloring agent particularly in a portion where the leakage of the liquid fuel easily occurs at the outer peripheral portion of the liquid fuel holding section, the leakage can be detected by using a small amount of coloring agent.

With this arrangement, the short circuit and malfunction of the device caused by the liquid fuel leakage from the liquid fuel container in the electronic equipment of a portable information terminal device or the like in which such a fuel cell system is employed as a power source can be avoided by discovering the leakage in the early stage and by appropriate measures.

Moreover, a fuel cell system, which can reduce the influences on the environment by taking measures in the early stage and is excellent in the aspects of environment and safety, can be provided.

Moreover, according to another aspect of the present invention, by placing the coloring agent covering roughly the entire outer peripheral portion of the liquid fuel holding section, the leakage from every portion of the liquid fuel holding section can reliably be detected.

Moreover, by placing the coloring agent in the neighborhood of the portion connected to the liquid fuel holding section in the fuel cell system, reliable detection in the position of a high risk of leakage can be achieved.

Moreover, by providing the liquid fuel container with the coloring agent holding section that holds the coloring agent, the coloring agent placed at the outer peripheral portion of the liquid fuel holding section can be prevented from leaking out of the liquid fuel container. Furthermore, the coloring agent can be provided in a variety of modes, so that coloring agents in various kinds of modes of liquid, powder and so on can use be used.

Moreover, with the arrangement that the liquid fuel is methanol and the coloring agent is cobalt chloride of a solid phase, a change in color into red can be generated by mutual contact, and the detection of the leakage can be achieved with reliable visibility.

Moreover, with the arrangement that the liquid fuel is methanol and the coloring agent is a cobalt chloride aqueous solution, the cobalt chloride aqueous solution in a pink color state leaks in mixture with the minute amount of methanol even when a sufficient coloring reaction for the visual recognition cannot be obtained due to the leakage of a minute amount of methanol, the leakage can be visually detected with reliably.

Moreover, by holding cobalt chloride of the solid phase, which can easily be handled and has a low risk of leakage, before the fuel cell system is equipped with the liquid fuel container and generating a cobalt chloride aqueous solution by introducing part of water generated by electric power generation after the equipment of the fuel cell system, even a minute amount of leakage can be detected.

Moreover, by placing the coloring agent at the outer peripheral portion of the liquid fuel holding section and the product holding section and making the leaked liquid identifiable by a difference between a change in color with the liquid fuel and a change in color with water, the leaked liquid can be visually distinguished, and measures against the leakage can be taken swiftly and appropriately.

Moreover, by providing the visual recognition window, the color of the change in color as described above can reliably be visually recognized.

Moreover, by providing the coloring agent holding section with the absorber that absorbs and retains the liquid fuel leaked from the liquid fuel holding section, the risk of the leakage of the leaked liquid fuel to the outside of the container can be reduced, and the liquid fuel can be retained by the absorber in the state in which the liquid fuel is colored by the coloring agent. Therefore, by visually recognizing the change in the color of the absorber, the occurrence of the leakage can be visually recognized.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
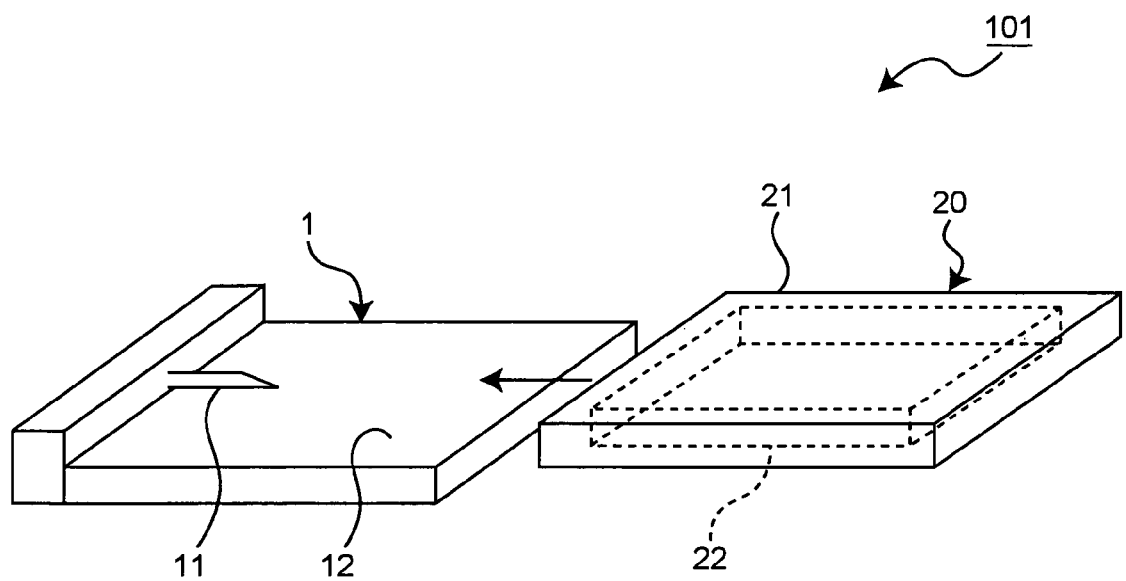
FIG. 1 is a schematic perspective view showing the construction of a fuel cell system according to a first embodiment of the present invention.

Before the description of the present invention proceeds, it is to be noted that like parts are designated by like reference numerals throughout the accompanying drawings.

Hereinbelow, one embodiment of the present invention is described in detail with reference to the accompanying drawings.

First Embodiment

FIG. 1 shows a schematic perspective view showing the construction of a fuel cell system detachably equipped with a liquid fuel container according to the first embodiment of the present invention.

As shown in FIG. 1, a fuel cell system 101 has a power generation module 1 of one example of the fuel cell body for generating electric power by electrochemically converting the chemical energy of the supplied liquid fuel into electrical energy and a cartridge 20 of a liquid fuel of one example of the liquid fuel container for holding the liquid fuel in the power generation module 1 while allowing the fuel to be supplied. Moreover, the power generation module 1 has a cartridge mounting portion 12 (one example of the container mounting portion) on the illustrated upper surface of which the cartridge 20 is detachably mounted. The cartridge mounting portion 12 has an inlet 11 (one example of the connection port) of the liquid fuel from the equipped cartridge 20 into the power generation module 1. The inlet 11 is constructed of a tubular member in which a passage for supplying the liquid fuel is internally formed, and the liquid fuel held in the cartridge 20 can be supplied to the power generation module 1 by inserting the opened end into the cartridge 20.

Figure 2A:
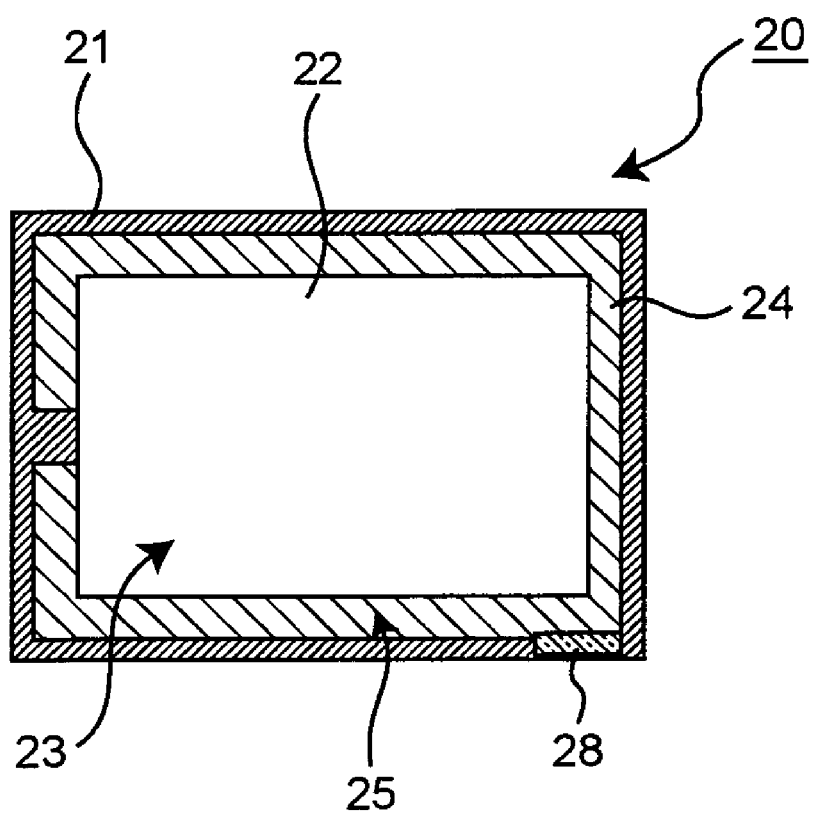
FIG. 2A is a schematic sectional view (transversal sectional view) showing the internal structure of a cartridge that holds the liquid fuel of the first embodiment.
Figure 2B:
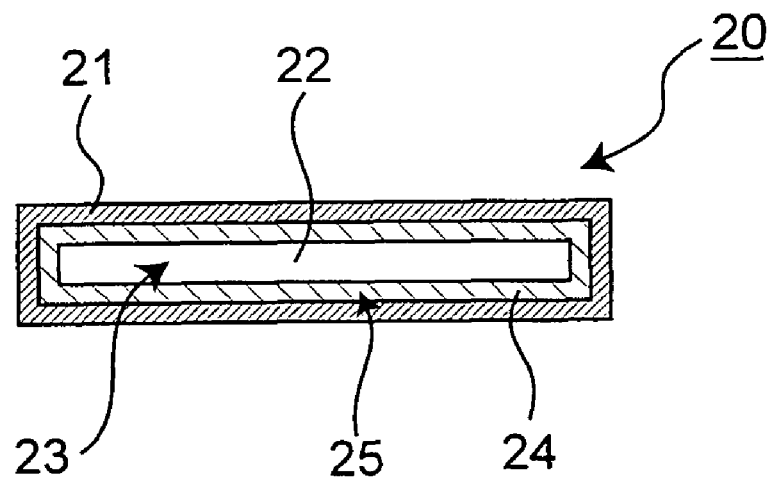
FIG. 2B is a schematic sectional view (longitudinal sectional view) showing the internal structure of the cartridge that holds the liquid fuel of the first embodiment.

A transversal sectional view is shown in FIG. 2A, and a longitudinal sectional view is shown in FIG. 2B as schematic sectional views showing the internal structure of the cartridge 20 of the liquid fuel.

As shown in FIGS. 2A and 2B, the cartridge 20 is a container for holding a liquid fuel 23 in its sealed internal space and includes a liquid fuel holding section 22 that is the container main body having the internal space and a casing 21 that houses the entire body of the liquid fuel holding section 22. Further, a space is provided between the inner side of the casing 21 and the outer peripheral surface of the liquid fuel holding section 22 along roughly the entire outer peripheral surface, and a powdered cobalt chloride 25 of one example of the coloring agent (liquid fuel coloring substance) that changes the color of the contact portion by coming in contact with the liquid fuel is held in the space. The space serves as a coloring agent holding section 24. In the cartridge 20, the cobalt chloride 25 is not placed at a connection port 30 that is the portion connected to the inlet 11 of the power generation module 1, and the cobalt chloride 25 is provided in the neighborhood of the connection port 30.

Figure 3:
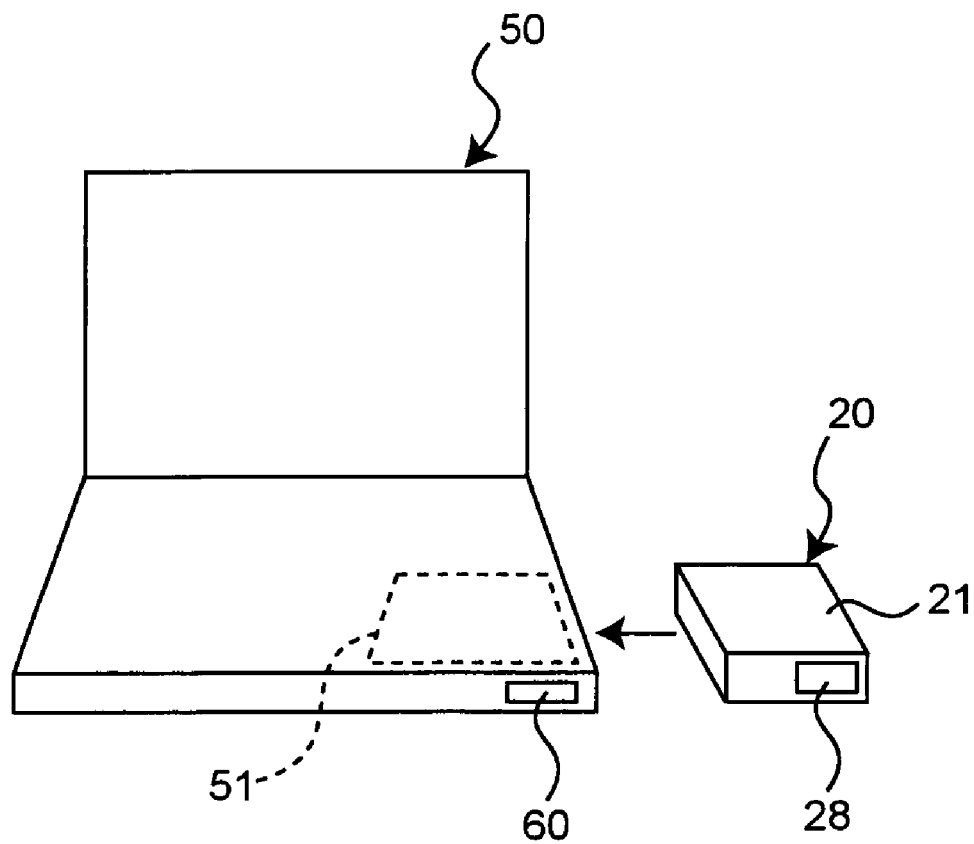
FIG. 3 is a schematic perspective view of electronic equipment equipped with the fuel cell system of the first embodiment.

Moreover, FIG. 3 shows a schematic perspective view of electronic equipment 50 equipped with such a fuel cell system 101 as a power source therefor. The liquid fuel cartridge 20 is allowed to have a configuration arbitrarily determined according to a cartridge slot portion 51 of the electronic equipment 50, or, for example, a portable information terminal device (laptop type personal computer, portable telephone or the like).

Moreover, by inserting the cartridge 20 into the cartridge slot portion 51 of the electronic equipment 50 and connecting the connection port 30 of the cartridge 20 to the inlet 11 of the power generation module 1, an amount of supply of the liquid fuel sufficient for generating electric energy necessary for power generation in the power generation module 1 can be supplied from the cartridge 20. The liquid fuel cannot be supplied before the connection is made or after the connection is released.

Figure 2C:
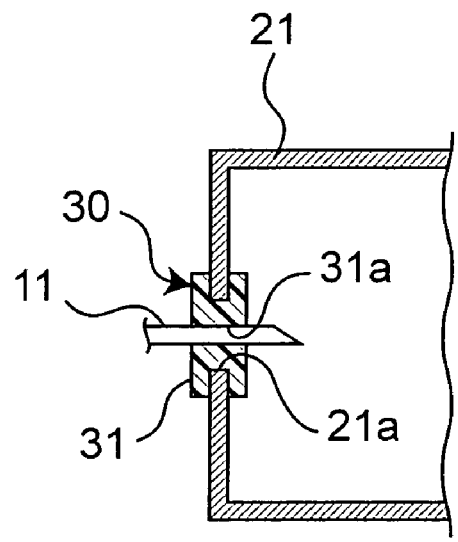
FIG. 2C is a partially enlarged schematic view of a connection port of the cartridge of FIG. 2A showing a state in which the port is connected to an inlet.
Figure 2D:
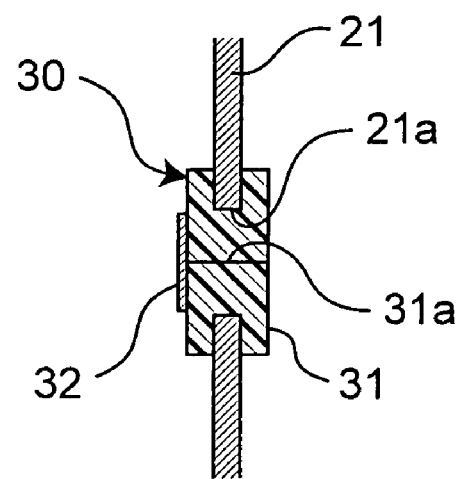
FIG. 2D is a partially enlarged schematic view showing a state in which the connection port of FIG. 2C is not connected to the inlet.

In this case, FIG. 2C shows a partially enlarged schematic view showing the construction of the connection port 30 of the cartridge 20. As shown in FIG. 2C, an elastic material of, for example, a rubber member 31 is placed plugging an opening 21*a* of the casing 21. Moreover, a penetrative passage 31*a* that penetrates from the inside to the outside of the casing 21 is formed roughly in the vicinity of the center of the rubber member 31. Moreover, the penetrative passage 31*a* is constructed so that it is closed by the elastic force of the rubber member 31 when the connection port 30 is not connected to the inlet 11. As shown in FIG. 2C, by connecting the connection port 30 to the inlet 11, the penetrative passage 31*a* is spread to allow the mutual connection of both of them. As shown in FIG. 2D, by sticking a seal 32 that seals the penetrative passage 31*a* to, for example, an unused cartridge 20, the leakage of the liquid fuel from the penetrative passage 31*a* can reliably be prevented.

Moreover, the present first embodiment uses methanol (or a methanol aqueous solution) as the liquid fuel 23, and the fuel cell system 101 is the direct type methanol fuel cell (DMFC (Direct Methanol Fuel Cell).

The principle of operation of the electric power generation in such a fuel cell system is described here. In the fuel cell system 101, electric power generation is achieved by supplying methanol from the equipped cartridge 20 to the power generation module 1 and directly taking protons out of the methanol in the power generation module 1.

In concrete, the power generation module 1 has an anode (fuel pole), a cathode (air pole) and a membrane electrode assembly. In the power generation module 1, the anode causes a reaction (anodic reaction) of extracting protons and electrons by oxidizing the supplied methanol. The extracted electrons move to the anode through an external circuit that electrically connects the anode with the cathode, while the protons move to the cathode through the membrane electrode assembly. Moreover, the cathode causes a reaction (cathodic reaction) of generating water by reducing externally supplied oxygen and the protons that have moved from the anode through the membrane electrode assembly by the electrons that have flowed through the external circuit. Electric power generation is thus carried out by flowing electrons through the external circuit by causing the oxidizing reaction at the anode and causing the reducing reaction at the cathode.

Moreover, as shown in FIGS. 2A and 2B, the coloring agent holding section 24 that holds the cobalt chloride 25 is constituted by forming a structure that covers the entire outer peripheral portion of the liquid fuel holding section 22 in the space between the liquid fuel holding section 22 and the casing 21 in the cartridge 20 as described above. With the structure that covers the whole body, the methanol of the liquid fuel 23 and the cobalt chloride 25 react with each other by mutual contact, consequently allowing the leaked liquid fuel 23 and the contact portion to be changed in color in response to the leakage of the liquid fuel 23 from every portion of the liquid fuel holding section 22.

In this case, the cobalt chloride 25 used as the coloring agent has a characteristic that its color is changed by a solvent. That is, the cobalt chloride aqueous solution is colored in pink when the solvent is water, and the methanol solution of cobalt chloride is colored in red when the solvent is methanol.

By taking advantage of the property of the cobalt chloride 25, the colorless transparent liquid fuel 23 is to be colored in red as a consequence of reaction with the cobalt chloride 25 when the methanol of the liquid fuel 23 leaks from the liquid fuel holding section 22. Although the case where the cobalt chloride 25 is used as the coloring agent of the leaked methanol is described in the present first embodiment, the coloring agent is not limited only to the case. Instead of the case, for example, aqueous ink or the like can be used as the coloring agent. One that has the function of coloring the leaked liquid fuel 23 in contact with the leaked liquid fuel 23 is possessed can be used as the coloring agent. However, in selecting the coloring agent, the safety at the time of the change in color by contact needs to be considered.

Moreover, in order to confirm the fact that the liquid fuel 23 has been colored as the result of the leakage of the liquid fuel 23 from the liquid fuel holding section 22, a transparent portion 28 of one example of the visual recognition window is provided at the casing 21 that is the packaging of the cartridge 20 as shown in FIGS. 2A and 3. Further, at the packaging of the electronic equipment 50 in which the cartridge 20 is inserted, a transparent portion 60, which is one example of the device side visual recognition window, is provided in a position aligned with the position where the transparent portion 28 of the inserted cartridge 20 is located. By thus providing the transparent portions 28 and 60, it is possible to visually detect whether or not the cobalt chloride 25 in the coloring agent holding section 24 is changed in color through the transparent portion 28 of the cartridge 20 from the transparent portion 60 of the electronic equipment 50 in the state in which the cartridge 20 is inserted.

As a result, when the liquid fuel 23 leaks from the liquid fuel holding section 22, the leaked liquid fuel 23 enters the coloring agent holding section 24 and colored in red in contact with the cobalt chloride 25. Therefore, by visually recognizing the change in color through the transparent portions 28 and 60, the leakage of the liquid fuel 23 can be detected. In the case, the use of the electronic equipment 50 is stopped and the user can be informed of the necessity of the replacement of the cartridges 20 since it might cause the troubles of leakage, deterioration of the electronic components, contact failure and so on if the electronic equipment 50 is continuously used as it is.

In present first embodiment, a leakage detecting unit for carrying out the detection (detection by visual observation) of the leakage of liquid fuel 23 is constituted of the cobalt chloride 25 and the coloring agent holding section 24.

Although the case where the transparent portion 28 that allows the visual recognition of the color of the cobalt chloride 25 held in the coloring agent holding section 24 is provided in a part of the casing 21 of the cartridge 20 has been described in the present first embodiment, it is acceptable to provide the transparent portion 28 roughly along the entire periphery of the casing 21 or form the casing 21 itself of a transparent material allowing the inside to be visually recognized instead of the above case. In such a case, the state of the color of the cobalt chloride 25 held in the coloring agent holding section 24 can be visually recognized in every position, and even a minute leakage can be detected swiftly and easily. When the transparent portion 28 is provided in a part of the casing 21 as described above, it is effective to place the transparent portion in a location of a high possibility of leakage.

Moreover, although the case where the powdered cobalt chloride 25 is held in the coloring agent holding section 24 of the cartridge 20 has been described according to the above description, it may be a case where a cobalt chloride aqueous solution is held as the coloring agent instead of the above case. Such a cobalt chloride aqueous solution has a pink color and has the characteristic that its color is changed into a red color by reacting with the methanol of the liquid fuel 23.

Therefore, when the liquid fuel 23 leaks from the liquid fuel holding section 22, the leaked liquid fuel 23 and the cobalt chloride aqueous solution change in color into a red color to allow the color change to be visually recognized. Furthermore, when the cobalt chloride aqueous solution itself leaks from the casing 21 of the cartridge 20, the leakage can be detected swiftly and easily due to the fact that the cobalt chloride aqueous solution has a pink color. Moreover, by virtue of the change in color as described above, the leaked liquid can easily be identified.

Particularly, when the leaked liquid fuel 23 has a minute amount, it is presumably the case where a change in color sufficient for visual recognition does not occur in the case of the powdered cobalt chloride 25. However, by using the cobalt chloride aqueous solution that already has a pink color as the coloring agent, the pink liquid leaked from the cartridge 20, i.e., the cobalt chloride aqueous solution can be visually recognized reliably and easily even when a minute amount of leaked liquid fuel 23 leaks and a sufficient change in color does not occur. Therefore, even a minute amount of leakage can reliably be detected.

Although the leakage can be detected also by preliminarily coloring the liquid fuel 23 itself, continuously supplying the colored liquid fuel to the electrolytic membrane used in the fuel cell might possibly impair the function and characteristics of the electrolytic membrane, and this is unfavorable. Moreover, it is preferable that the leakage can swiftly be detected before the liquid leaks from cartridge 20 in the electronic equipment 50 that refuses the leakage of the liquid. Also from the above viewpoint, it can be regarded as effective that the construction in which the liquid fuel 23 itself is held in the colorless transparent state and is not colored until the leakage occurs, and the cartridge 20 has the dual structure of the liquid fuel holding section 22 for holding the liquid fuel 23 and the casing 21 to reduce the possibility of the occurrence of liquid leakage to the outside of the cartridge 20.

Moreover, the case where the cobalt chloride 25 is placed roughly covering the entire outer peripheral portion of the liquid fuel holding section 22 has been described. However, instead of the construction, it may be a case where the cobalt chloride 25 is placed only at a part of the outer peripheral portion. Depending on the structural features of the cartridge 20, there might be a portion where the liquid fuel easily leaks. In such a case, the leakage can effectively be detected by placing the cobalt chloride 25 only at the portion.

Moreover, it may be a case where the placement of the cartridge slot portion 51 is determined so that heat generated by driving the electronic equipment 50 is conducted to the cartridge 20 inserted in the cartridge slot portion 51 in the electronic equipment 50 shown in FIG. 3.

By thus determining the placement of the cartridge slot portion 51 in the electronic equipment 50, the generated heat can positively be conducted to the cartridge 20, and the temperature of the cobalt chloride 25 held in the coloring agent holding section 24 (or the liquid fuel 23 held in the liquid fuel holding section 22) can be raised. By thus keeping the cobalt chloride 25 at the raised temperature as described above, the reaction of methanol of the liquid fuel 23 with the cobalt chloride 25 can be promoted further than in the case of normal temperature when, for example, the leakage of the liquid fuel 23 occurs, and the change in color caused by the reaction can be made remarkable. Therefore, even when the leakage of a minute amount of liquid fuel occurs, the leakage can be detected by making the color change remarkable. It is preferable that the cartridge slot portion is determined to be located in a portion of a highest temperature or a portion where a temperature sufficient for promoting the reaction is obtained.

Moreover, methanol has the characteristics of not only inflammability but also toxicity to the human body and has the characteristic that it is easily absorbed by inhalation, exposure to the skin and the like. Therefore, sufficient care is necessary for storage and handling. In contrast to this, cobalt chloride is used for silica gel in the products on the market. The silica gel is a substance that is used as a safe and harmless desiccant, recognized as a food additive and basically harmless to the human body merely by a lick. Therefore, even if the cobalt chloride for detecting the leakage of methanol leaks, it is safer than in the case where methanol leaks.

Second Embodiment

Figure 4:
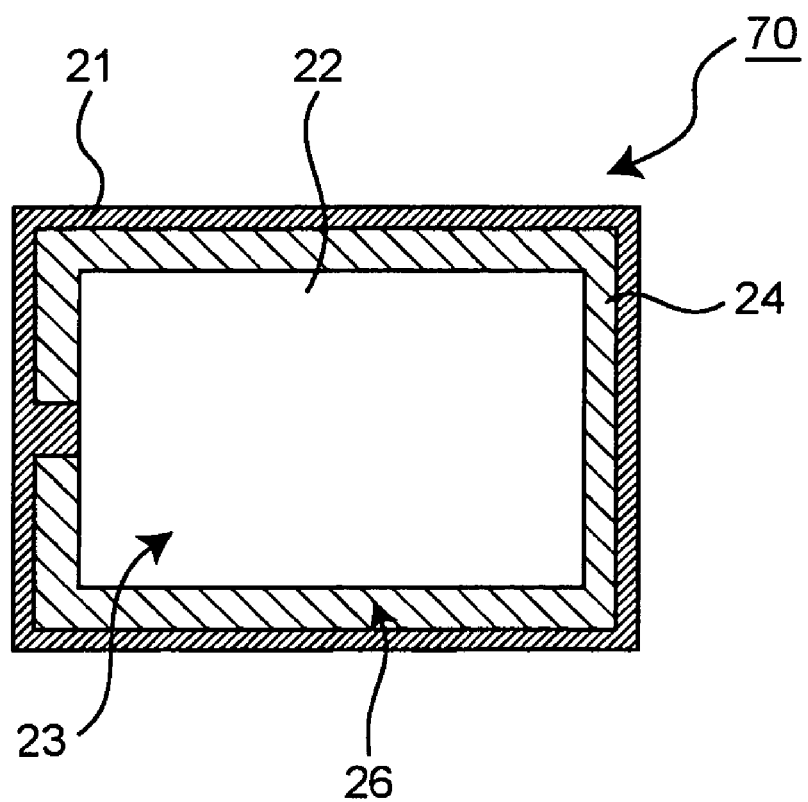
FIG. 4 is a schematic sectional view of a cartridge according to a second embodiment of the present invention.

The present invention is not limited to the first embodiment but practicable in various modes. For example, FIG. 4 shows a schematic sectional view showing the internal structure of a cartridge 70 of one example of the liquid fuel container according to the second embodiment of the present invention. The cartridge 70 of the present second embodiment can also be used in the fuel cell system 101 of the first embodiment, and no description is provided for the components similar to those of the first embodiment.

As shown in FIG. 4, in the cartridge 70, a cobalt chloride paper 26 is placed in a coloring agent holding section 24 that is a space between the outer peripheral portion of the liquid fuel holding section 22 and the casing 21 instead of the powdered cobalt chloride 25.

The cobalt chloride paper 26 used here improves its waterproof property with the outside thereof provided with a laminate of polyethylene. Polyethylene is a safe material that is used for laminate layers on both sides of paper generally used for a milk carton and is constituted only of hydrogen and carbon and excellent in the aspect of the waterproof property. By providing laminate layers of polyethylene on the outside of the cobalt chloride paper 26, the cobalt chloride paper 26 is colored in red by the infiltration of the liquid fuel 23 leaked from the liquid fuel holding section 22 from inside the cobalt chloride paper 26. Furthermore, since the outside of the cobalt chloride paper 26 is excellent in the aspect of the waterproof property, the liquid fuel 23 leaked from the liquid fuel holding section 22 can be prevented from leaking out of the cartridge 20.

As described above, by using the cobalt chloride paper 26 of which the outside is laminated with polyethylene as the coloring agent, the leakage of the liquid fuel 23 from the liquid fuel holding section 22 can be detected on the basis of the change in the color of the cobalt chloride paper 26. Furthermore, the leakage of the liquid fuel 23 to the outside of the cartridge 20 can be suppressed.

Third Embodiment

Figure 5:
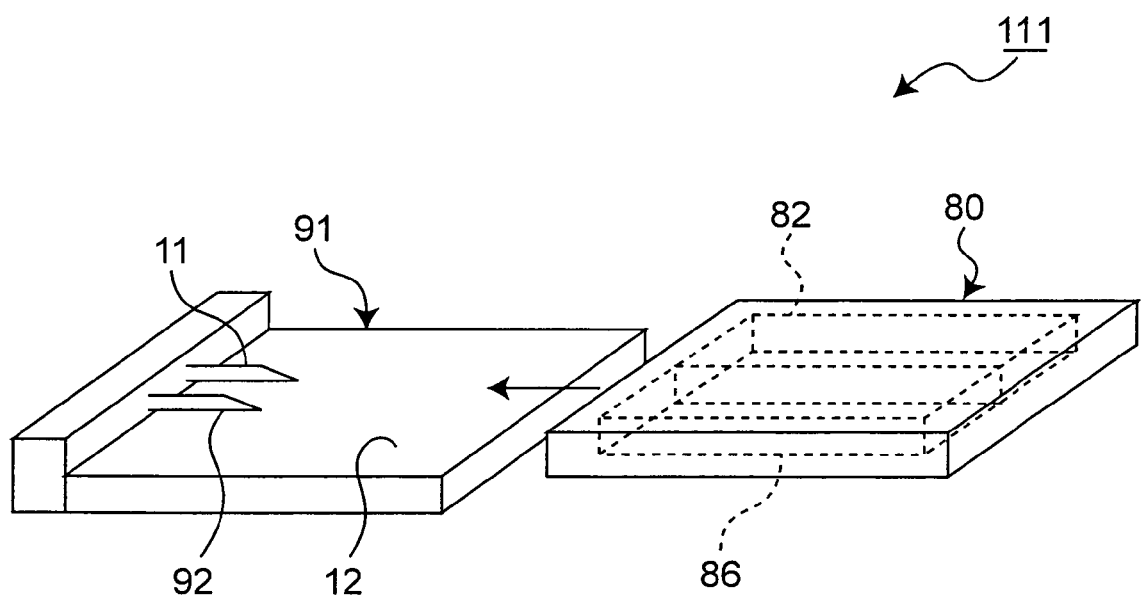
FIG. 5 is a schematic perspective view showing the construction of a fuel cell system according to a third embodiment of the present invention.
Figure 6:
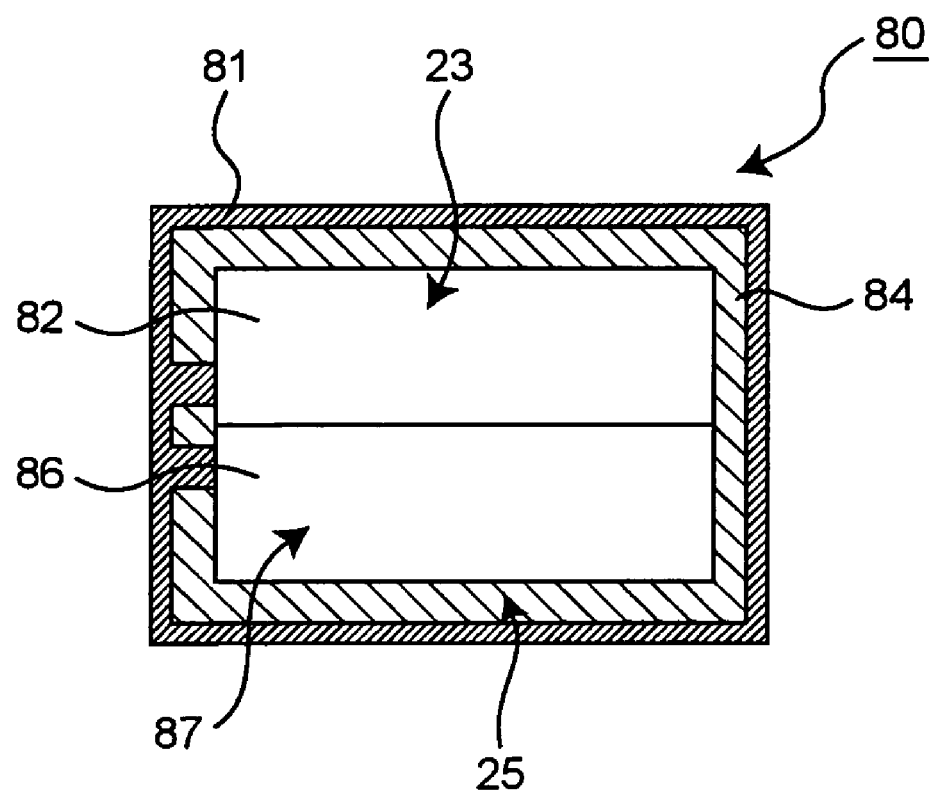
FIG. 6 is a schematic sectional view showing the internal structure of a cartridge according to the third embodiment of the present invention.

Next, FIG. 5 shows a schematic perspective view showing the construction of a fuel cell system 111 detachably equipped with a cartridge 80 of one example of the liquid fuel container according to the third embodiment of the present invention. FIG. 6 shows a schematic sectional view showing the internal construction of the cartridge 80.

The fuel cell system 111 of the present third embodiment differs from the fuel cell system 101 of the first embodiment in that it has a construction in which water (or emission matter) due to electric power generation is collected in the cartridge 80. In concrete, as shown in FIG. 5, a power generation module 91 provided for the fuel cell system 111 has a water outlet 92 besides the liquid fuel inlet 11. Further, the cartridge 80 has a product holding section 86, which can be attached to and detached from the power generation module 91, placed adjacent to the liquid fuel holding section 82 as shown in FIG. 6, releasably connected to the water outlet 92 of the power generation module 91 and collects and holds water 87. Moreover, both the liquid fuel holding section 82 and the product holding section 86 are housed in the casing 81. Further, powdered cobalt chloride 25 is placed in a space between the outer peripheral portions of the liquid fuel holding section 82 and the product holding section 86 and the casing 81, covering the entire outer peripheral portion. It is noted that the space serves as a coloring agent holding section 85 that holds the cobalt chloride 25.

In the cartridge 80 that has the construction, by bringing the liquid fuel 23 leaked from the liquid fuel holding section 82 or the water 87 leaked from the product holding section 86 in contact with the cobalt chloride 25 held in the coloring agent holding section 84, the leaked liquid can be changed in color. In concrete, by reacting methanol of the liquid fuel 23 with the cobalt chloride 25, the methanol can be colored from colorless to red. Moreover, by reacting the water 87 with the cobalt chloride 25, the water can be colored from colorless to pink. As described above, the coloring is varied depending on when the cobalt chloride 25 reacts with the methanol of the liquid fuel 23 or when the cobalt chloride 25 reacts with the water 87. Therefore, the liquid leaked from the cartridge 80 can be identified by the color. Moreover, the fact that the kind of the thus-leaked liquid can be identified becomes effective for taking appropriate measures also because the anti-leakage measures are different between methanol that has inflammability and toxicity and water that has neither one of them.

Particularly, in the electronic equipment equipped with the fuel cell system 111 as a power source, even the leakage of water generated by electric power generation causes short circuit, contact failure and so on besides the liquid fuel 23. Therefore, collection of water to the cartridge 80 provided with the anti-leakage measures of the liquids becomes effective.

Moreover, it may be a case where a construction in which the powdered cobalt chloride 25 held in the coloring agent holding section 84 is formed into a cobalt chloride aqueous solution colored in pink is adopted by introducing part of the water 87 collected in the product holding section 86 through the water outlet 92 into the coloring agent holding section 84 in place of the construction of the cartridge 80 as described above. By using the cobalt chloride aqueous solution as the coloring agent, the effect that the minute leakage as described in connection with the first embodiment can reliably be detected can be obtained. In addition, since the powdered cobalt chloride 25 is held in the cartridge 80 before the fuel cell system 111 is equipped with the cartridge 80 and not formed into the cobalt chloride aqueous solution until the equipment of the cartridge 80, the risk of the leakage of the cobalt chloride 25 during the transportation of the cartridge 80 can be further reduced.

Figure 9:
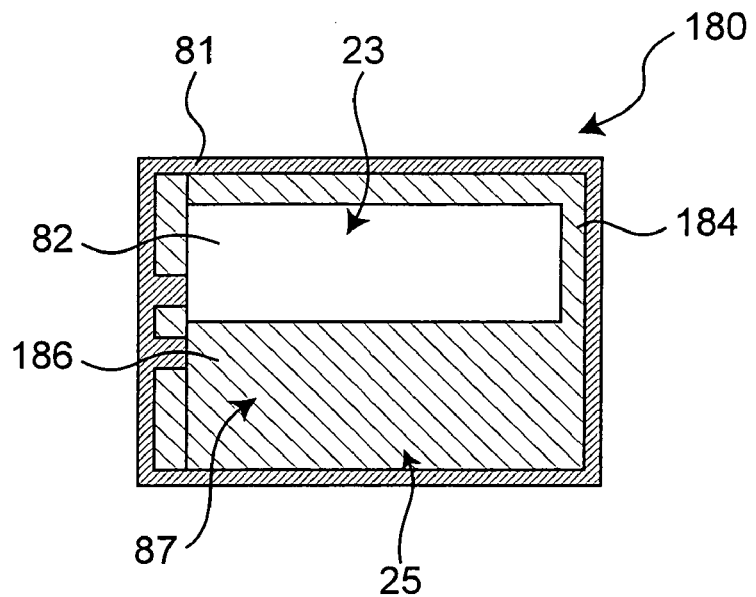
FIG. 9 is a schematic sectional view showing the internal structure of a cartridge according to a modification example of the third embodiment.
Figure 10:
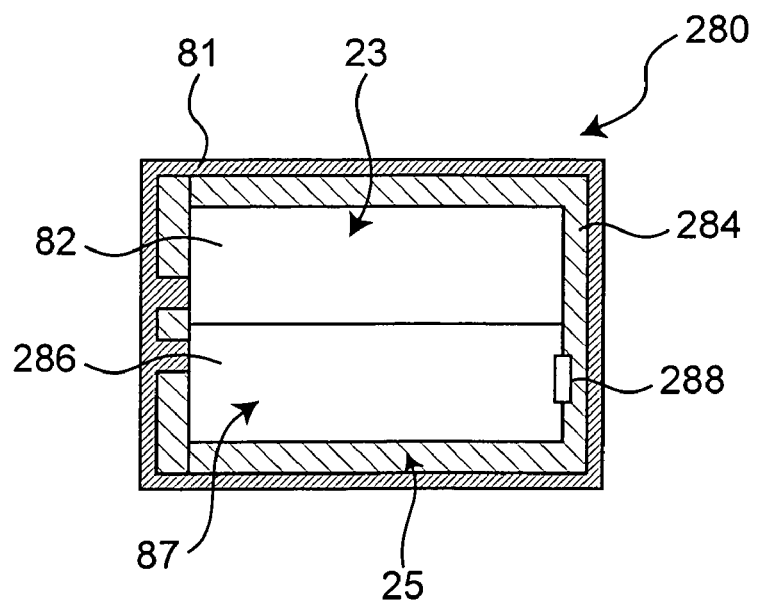
FIG. 10 is a schematic sectional view showing the internal structure of a cartridge according to another modification example of the third embodiment.

As a concrete construction (construction of a modification example of the third embodiment), a construction, in which a coloring agent holding section 184 and a product holding section 186 have an integrated structure and the water 87 collected into a product holding section 186 through the water outlet 92 is introduced into the coloring agent holding section 184 of the integrated structure as it is as in a cartridge 180 of which the schematic sectional view is shown in FIG. 9, can be adopted. Moreover, a construction, in which a membrane (e.g., filter paper) 288 that allows the generated water 87 of the liquid to pass and does not allow the powdered cobalt chloride 25 of the solid to pass therethrough is provided between a product holding section 286 and a coloring agent holding section 284 as in a cartridge 280 of which the schematic sectional view is shown in FIG. 10, can also be adopted.

Fourth Embodiment

Figure 7:
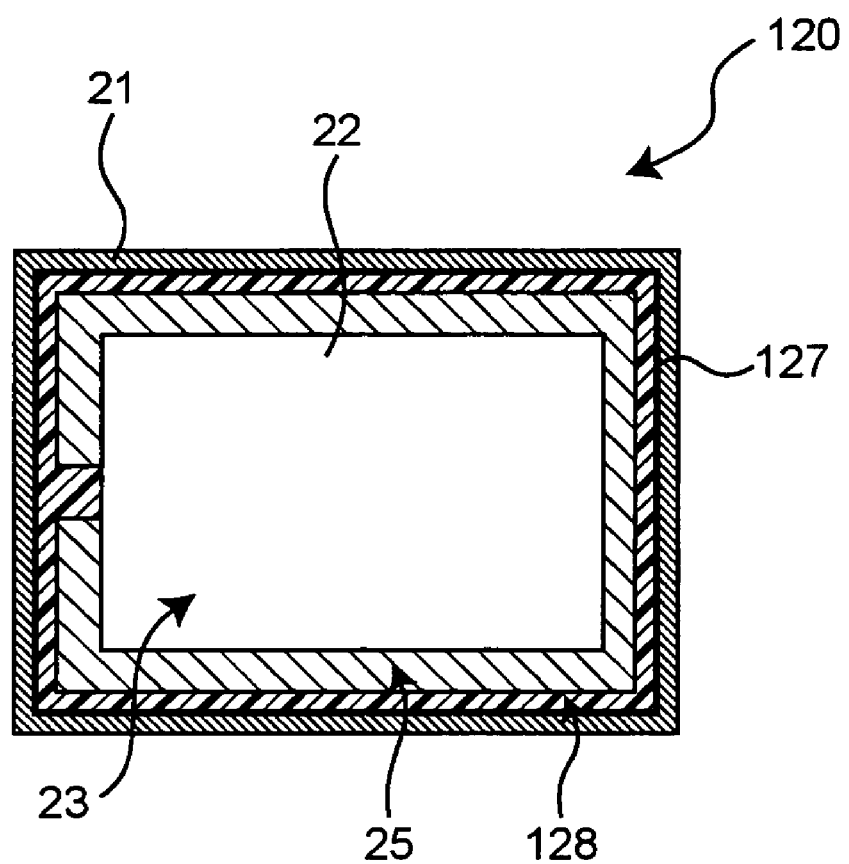
FIG. 7 is a schematic sectional view showing the internal structure of a cartridge according to a fourth embodiment of the present invention.

Next, FIG. 7 shows a schematic sectional view showing the internal construction of a cartridge 120 of one example of the liquid fuel container according to the fourth embodiment of the present invention.

As shown in FIG. 7, the cartridge 120 has a liquid fuel holding section 22 and a coloring agent holding section 127 formed in a space between the outer peripheral portion of the liquid fuel holding section 22 and the casing 21. Cobalt chloride 25 of the coloring agent is held in the coloring agent holding section 127, and an absorber 128 for absorbing and retaining the liquid fuel 23 is further placed on the outside of the coloring agent holding section 127.

The absorber 128 is formed of sodium polyacrylate, which is generally used for, for example, a paper diaper and the like. A synthetic polymer for improving the water absorbing property and the water-holding capacity is the water absorbing polymer or polymer absorber, which increases the water absorbing property by providing many hydrophilic parts in large molecules. The most general one is sodium polyacrylate, which is formed into a polymer by binding numbers of molecules of acrylic acid by reaction. This is a white powder before absorbing water and is able to be put into a soft transparent state with water added and to absorb and retain water of an amount about 500 times its weight.

Moreover, by providing the absorber 128 at the connection port of the power generation module 1 and the cartridge 120 and in the neighborhood of the liquid fuel inlet 11, where the probability of the occurrence of liquid leakage is high, the leakage of the liquid fuel to the outside of the cartridge 120 can be reduced as far as possible.

Although the cartridge 120 has the construction in which the liquid fuel 23 generated from the harmful methanol is absorbed by the absorber 128 so as not to leak, the absorber 128 merely absorbs the leaked liquid fuel 23, and the absorber 128 constituted of sodium polyacrylate is solidified by absorbing the liquid fuel 23 with the methanol aqueous solution internally retained.

Therefore, even if the leaked methanol is solidified and retained by the absorber 128, the methanol is not rendered harmless and remains intact unless the cartridge 120 is replaced. Therefore, if the cartridge 120 is damaged and the absorber 128 leaks to the outside, the possibility of exerting a bad influence on the human body and the environment cannot be denied.

Therefore, the absorber 128 is colored by coloring the liquid fuel 23 with the cobalt chloride 25 when it leaks and absorbing the colored liquid fuel 23 by the absorber 128. The cartridge 120, which allows the confirmation of the leakage of the liquid fuel 23 in the early stage by the change in the color of the absorber 128 or the change in the color of the leaked liquid fuel 23 and is excellent in the aspects of safety and environment, can be provided.

The absorber 128 may be placed locally in a position of a higher possibility of leakage in the liquid fuel holding section 22 instead of being provided on the entire surface of the outer peripheral portion of the liquid fuel holding section 22. Particularly, in a cartridge 120 that needs to be reduced in size and thickness for the achievement of satisfactory portability, the reduction in the size and thickness can be achieved with the function of absorbing the leaked liquid fuel by locally placing the absorber 128 as described above.

Fifth Embodiment

Figure 8:
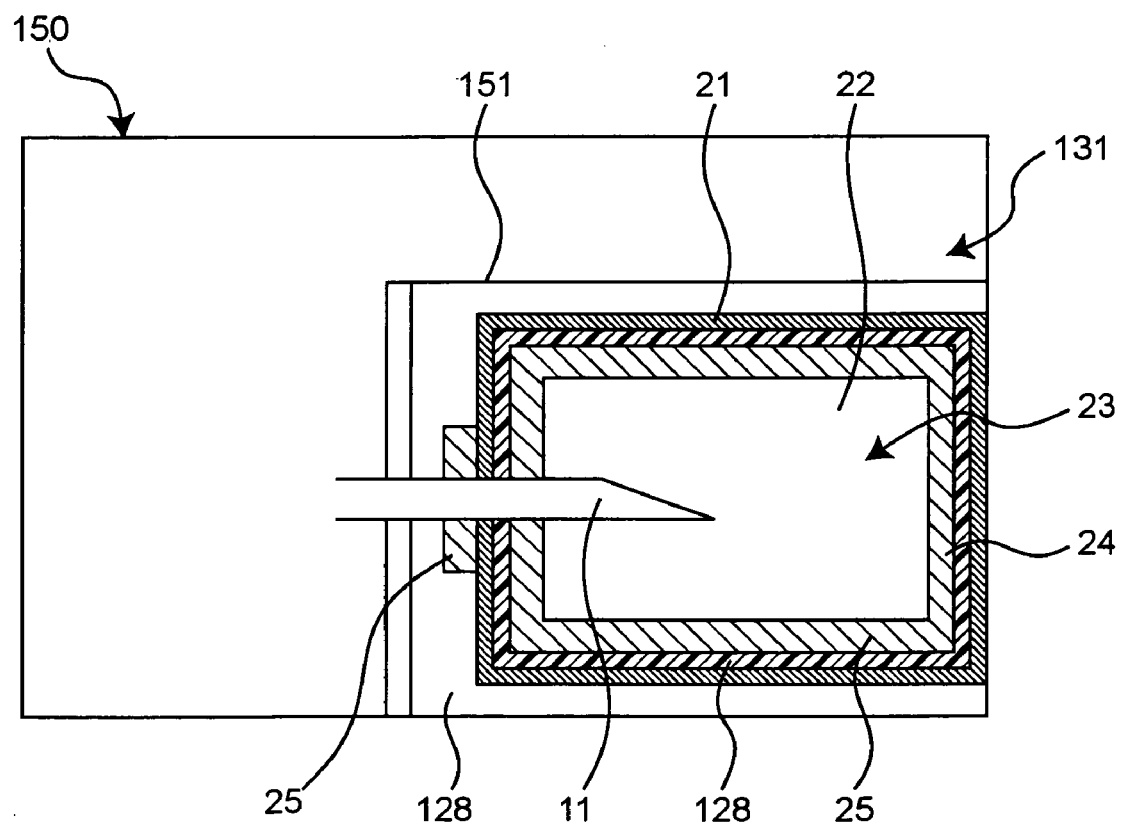
FIG. 8 is a schematic structural view of a fuel cell system according to a fifth embodiment of the present invention.

Next, FIG. 8 shows a schematic view (a schematic sectional view showing the internal structure of a cartridge 140) showing the construction of a fuel cell system 131 detachably equipped with the cartridge 140 of one example of the liquid fuel container according to the fifth embodiment of the present invention.

As shown in FIG. 8, the cartridge 140 has the liquid fuel holding section 22, the coloring agent holding section 24 that holds the powdered cobalt chloride 25 and the absorber 128. Moreover, the fuel cell system 131 is mounted on the electronic equipment 150 of a portable information terminal device or the like, and the fuel cell system 131 is equipped with a cartridge mounting portion 151 on which the cartridge 140 is detachably mounted. Further, in the cartridge mounting portion 151, the cobalt chloride 25 is placed around the liquid fuel inlet 11 connected to the cartridge 140, and the absorber 128 is placed in a portion of the cartridge mounting portion 151 where the cartridge 140 is placed.

In the fuel cell system 131 of the construction, when the cartridge 140 is attached to or detached from the cartridge mounting portion 151 of the electronic equipment 150, the liquid fuel 23 might possibly leak from the connection port, i.e., the inlet 11. In the case, by coloring the leaked liquid fuel 23 with the cobalt chloride 25 provided in the neighborhood of the portion connected to the cartridge 20 in the cartridge mounting portion 151 of the electronic equipment 150, the leakage can be visually detected. Furthermore, by absorbing the leaked liquid fuel 23 by the absorber 128 provided at the cartridge mounting portion 151 of the electronic equipment 150, the diffusion of the leaked liquid fuel can be suppressed. By providing the absorber 128 at the cartridge mounting portion 151 of the electronic equipment 150 by an amount sufficient for absorbing the liquid fuel even when the liquid fuel holding section 22 of the cartridge 140 is fully filled with the liquid fuel 23, the leakage of the liquid fuel 23 to the outside of the electronic equipment 150 can be prevented.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosure of Japanese Patent Application No. 2004-140651 filed on May 11, 2004 including specification, drawing and claims are incorporated herein by reference in its entirety.

The present invention allows the discovery of the leakage of the held liquid fuel visually, swiftly and easily in the fuel cell system that generates electric power by electrochemically converting the chemical energy owned by the liquid fuel into electrical energy and is useful in the point that the occurrence of failures and the like attributed to the leakage in the electronic equipment or the like in which the fuel cell system is employed can be avoided. Moreover, the present invention is useful in the aspects of environment and safety since the influence on the environment can be reduced by taking appropriate measures by the discovery of the leakage in the early stage.

The invention claimed is:

1. A fuel cell system comprising:
 a power generation module;
 a liquid fuel container configured to hold a liquid fuel used in the power generation module while allowing the fuel to be supplied to the power generation module;
 a container mounting portion on which the liquid fuel container is detachably mounted, wherein the liquid fuel container comprises:
  a liquid fuel holding section being configured to hold the liquid fuel; and a coloring agent disposed in at least part of the outer peripheral portion of the liquid fuel holding section, the coloring agent being configured to change the color of the liquid fuel when the coloring agent comes in contact with liquid fuel leaked from the liquid fuel holding section, wherein
 the container mounting portion has an inlet port through which the liquid fuel is supplied from the liquid fuel container into the power generation module, and wherein the liquid fuel container further comprises a product holding section that is configured to collect and hold water generated by electric power generation in the power generation module, the coloring agent is placed in part of the outer peripheral portion of the liquid fuel holding section and part of an outer peripheral portion of the product holding section, for changing color of the liquid fuel or the water such that the liquid fuel and water differ in color from each other when the color agent contacts the liquid fuel leaked from the liquid fuel holding section or the water leaked from the product holding section.

2. The fuel cell system as defined in claim 1, wherein the inlet port is constructed of a tubular member in which a passage for supplying the liquid fuel is internally formed, the passage having an opened end at one end.

3. The fuel cell system as defined in claim 1, wherein
 the liquid fuel holding section has a connection port for connecting with the inlet port of the container mounting portion, and
 the connection port has a passage through which the inlet port is in communication with the liquid fuel holding section.

4. The liquid fuel container fuel cell system as defined in claim 1, wherein the coloring agent is disposed so as to cover roughly the entire outer peripheral portion of the liquid fuel holding section.

5. The fuel cell system as defined in claim 1, wherein
the liquid fuel container has a connection port for connecting with the inlet port of the container mounting portion, and
the coloring agent is placed in a neighborhood of the connection port at the outer peripheral portion of the liquid fuel holding section.

6. The fuel cell system as defined in claim 1, further comprising:
a coloring agent holding section that is configured to hold the coloring agent in a state in which the coloring agent is placed at the outer peripheral portion of the liquid fuel holding section.

7. The fuel cell system as defined in claim 1, wherein the liquid fuel is methanol, and the coloring agent is formed containing cobalt chloride of a solid phase.

8. The fuel cell system as defined in claim 1, wherein the liquid fuel is methanol, and the coloring agent is a cobalt chloride aqueous solution.

9. The fuel cell system as defined in claim 8, wherein
the coloring agent holding section is configured to introduce part of water generated by electric power generation in the power generation module, and
the cobalt chloride aqueous solution is generated by the water introduced into the coloring agent holding section and held cobalt chloride of a solid phase.

10. The fuel cell system as defined in claim 1, wherein the coloring agent holding section has a visual recognition window that allows a state of color of the coloring agent to be visually recognized through the window.

11. The fuel cell system as defined in claim 1, wherein the coloring agent holding section further comprises an absorber for absorbing and retaining the liquid fuel leaked from the liquid fuel holding section.

12. A portable information terminal device including a power source of the fuel cell system as defined in claim 10 as a power source thereof, the terminal device comprising:
a device-side visual recognition window, which allows the state of the color of the coloring agent to be visually recognized through the visual recognition window of the liquid fuel container in a state where the container is mounted on the container mounting portion and is provided in a position aligned with the visual recognition window.

* * * * *